United States Patent [19]

Lane et al.

[11] Patent Number: 4,625,791

[45] Date of Patent: Dec. 2, 1986

[54] APPARATUS AND METHOD FOR OPERATING SOLUTION HEAT WITH VERTICAL HEAT EXCHANGERS

[75] Inventors: Michael L. Lane; Lowell T. Whitney; Paul C. Beck, all of Arvada, Colo.

[73] Assignee: Adolph Coors Company, Golden, Colo.

[21] Appl. No.: 729,914

[22] Filed: May 3, 1985

[51] Int. Cl.⁴ ..................... B64D 13/04; B64D 13/08
[52] U.S. Cl. ........................................ 165/115; 62/484
[58] Field of Search ................... 165/115, 116, 117, 1, 165/60; 62/79, 101, 238.1, 238.3, 484, 497, 476

[56] References Cited

U.S. PATENT DOCUMENTS

| | | | |
|---|---|---|---|
| 2,267,568 | 12/1941 | Kleucker | 165/115 X |
| 3,271,969 | 9/1966 | Lorentzen | 165/115 X |
| 4,235,281 | 11/1980 | Fitch et al. | 165/115 X |
| 4,338,268 | 7/1982 | Wilkinson | 62/484 |

FOREIGN PATENT DOCUMENTS

| | | | |
|---|---|---|---|
| 913782 | 7/1954 | Fed. Rep. of Germany | 165/115 |
| 79485 | 9/1931 | Sweden | 165/115 |

Primary Examiner—Lloyd L. King
Attorney, Agent, or Firm—Klass & Law

[57] ABSTRACT

Apparatus and method for operating solution heat with vertical heat exchangers by providing an improved heat exchangers design and method for exchanging heat between a waste heat source and a binary working fluid preferably in an absorption heat pump unit and in particular the desorber section thereof.

2 Claims, 5 Drawing Figures

APPARATUS AND METHOD FOR OPERATING SOLUTION HEAT WITH VERTICAL HEAT EXCHANGERS

BACKGROUND OF THE INVENTION

This invention relates to improvements in the heat exchanger apparatus in solution heat pump systems and in particular to apparatus and methods for improving the efficiency of heat exchange in the desorber and absorber in a waste heat powered solution heat pump application to up-grade waste heat by temperature boosting.

Many solution heat pump apparatus and methods have been developed. One of the first proposed practical uses of an absorption heat pump was reported by D. A. Williams and J. B. Tredemann at the Intersociety Energy Conversion Engineering Conference, 9th Proceedings, August, 1974 in a paper entitled Heat Pump Powered by Natural Thermal Gradients.

Additional work has been reported in various recent publications including patents and patent applications, including the following:

U.S. Pat. No. 4,333,515, issued June 8, 1982, inventor William H. Wilkinson et al entitled *Process and System for Boosting The Temperature of Sensible Waste Heat Sources;*

U.S. Pat. No. 4,338,268, issued July 6, 1982, inventor William H. Wilkinson et al, entitled *Open Cycle Thermal Boosting System;*

U.S. Pat. No. 4,402,795, issued Sept. 6, 1983, inventor Donald C. Erickson, entitled *Reverse Absorption Heat Pump Augmented Distillation Process.*

U.S. patent application Ser. No. 667,747, filed Nov. 2, 1984, inventors Michael L. Lane and Lowell T. Whitney entitled *Solution Heat Pump Apparatus and Method.*

The foregoing patents, patent application, and the references cited therein represent the current state of the temperature boosting art using solution heat pump technology and the heat exchanger apparatus used therein and these disclosures are incorporated herein by reference in their entirety.

In general, waste heat from industrial or other sources can be boosted to higher temperature levels by combining at least one relatively high pressure Rankine vapor generation cycle with at least one solution heat pump cycle. In a typical system, waste heat is utilized to boil off a fluid termed a refrigerant in the Rankine cycle evaporator to provide a source of vapor to an absorber in the solution heat pump. In the absorber, the refrigerant vapor is contacted with a binary working solution containing absorbent and refrigerant. As the refrigerant vapor is absorbed into the binary absorbent solution, its latent heat of absorption is given off to a heat exchanger at a temperature higher than the temperature of the waste heat source. The dilute binary solution from the absorber is throttled to reduce the pressure and then introduced into a relatively low pressure desorber in heat exchanging contact with a source of waste heat where a portion of the refrigerant is desorbed as vapor from the binary solution by the addition of waste heat. The desorbed vapor from the solution is then condensed by contact with a colder heat exchanger at a temperature less than the temperature of the vapor, and the condensate or refrigerant is then pumped to the evaporator for reevaporation. The concentrated solution is recycled from the desorber to the absorber, preferably through a heat exchanger where heat is exchanged with the dilute working solution being conveyed from the absorber to the desorber.

Waste heat sources which have been used to power solution or absorption heat pumps, as described, can be obtained from either sensible heat, latent heat or both. Utilization of a sensible waste heat source has been maximized by extracting successive portions of heat for use first in the Rankine cycle evaporator section and then in the heat pump cycle desorber section of a solution or absorption heat pump. Multiple cycle systems can also be employed to boost the temperature of a portion of the waste heat to higher levels than obtainable in single cycle systems.

In absorption systems, not only must efficient heat transfer occur in the absorber and desorber sections but also efficient mass transfer of refrigerant into and out of solution must occur. In prior absorption refrigeration systems, the desorber section of the system typically consisted of a chamber having heat exchange tubes immersed in a pool of binary solution. Heat transfer was limited by the surface area of the tubes, residence time of the solution, and back mixing, which occurred as new solution was fed into the chamber and as convective recirculation occurred in the pool. Mass transfer was similarly limited by what typically was the relatively small surface area of the pool of solution.

In particular, heat exchanger apparatus comprising vertical tubes with the waste heat source inside the vertical tubes and the concentrated LiBr-water working fluid in heat exchanging contact with the outside of the tubes has exhibited inefficiencies in practice as previously described.

Likewise, the prior absorber section heat exchanger with the heat being transferred from the working fluid on the outside of the tubes during absorption to the fluid on the inside of the tubes have also not provided the requisite efficiency heat exchange for economic utilization of such systems. Different heat exchanger designs, as previously shown, have attempted to solve some of these problems by structural arrangements to increase residence time of the working fluid by designs which formed smaller pools of working fluid in contact with the outer surface of the vertical tubes. Such apparatus were, however, large and expensive and has enjoyed only limited success.

It is, therefore, an objective of this invention to provide an improved heat exchanger design and method for exchanging heat between a waste heat source and a binary working fluid preferably in an absorption heat pump unit and in particular the desorber section thereof.

It is also an objective of this invention to provide an improved heat exchanger design, and method for exchanging heat between a binary working fluid and another fluid preferably in an absorption heat pump unit and in particular in the absorber section thereof.

It is a further objective of the present invention to incorporate improved design of the present invention in a vertical tube heat exchanger where the waste heat source is contained in the vertical tubes and the binary working fluid uniformly contacts the outside of the vertical tubes whereby a refrigerant, typically water, is desorbed from the binary fluid and the water vapor is subsequently condensed and the reconcentrated binary fluid is circulated to the absorber section of the solution heat pump.

It is still a further objective of the present invention to incorporate the improved design of the present invention in a vertical tube heat exchanger where the binary working fluid during absorption contacts the outside of the vertical tubes and efficiently transfers the heat of absorption to the fluid inside of the tubes.

BRIEF SUMMARY OF THE INVENTION

The present invention provides improved heat exchanging contact between a source of waste heat and a binary working solution by providing a uniform film of binary working solution on the outside surfaces of a vertical tube heat exchanger.

DETAILED DESCRIPTION OF THE INVENTION

It has been determined that it is necessary in a vertical tube heat exchanger, which is useful in either the absorber or desorber sections of a solution heat pump for temperature boosting, that there be a uniform film, particularly in the case of a desorber, of the binary working fluid on the outer surfaces of tubes containing a waste heat source for there to be efficient desorption of the excess refrigerant from the working solution or in the case of the absorber section efficient absorption of the refrigerant vapor and efficient heat transfer from the working solution to whatever media is used in the interior of the tubes.

In addition to maintain a uniform film of binary fluid in contact with the vertical tubes, it has been discovered that it is essential that there be a closely selected temperature difference between the binary working fluid and the waste heat source and a sufficient flow rate of binary solution down the surface of the tubes, to provide for up to two times the heat transfer efficiency than has been obtained utilizing conventional design criteria.

In addition, it has been learned that there are several secondary factors that are important to the practice of the present invention.

The system pressure, the heat transfer coefficient of the tube and the range of heat transfer rates, the tube composition and surface condition and configuration, and the total surface area of the tubes, the length of the tubes and the manner in which the working fluid is held and initially introduced onto the surfaces of the tube, must all be considered when employing the concepts of the present invention in the design of an improved heat exchanger.

Figure 1:
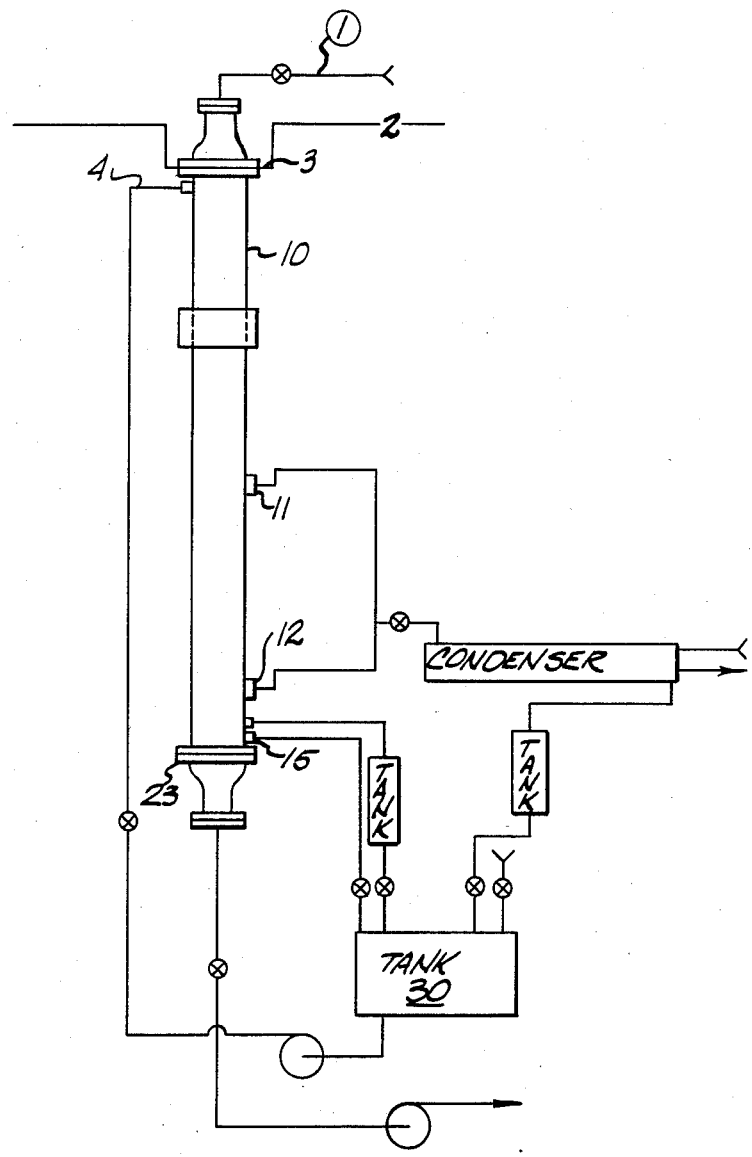
FIG. 1 is a schematic of a test apparatus for the evaluation of a vertical tube heat exchanger used as the desorber section of an absorption heat pump temperature boosting system.
Figure 2:
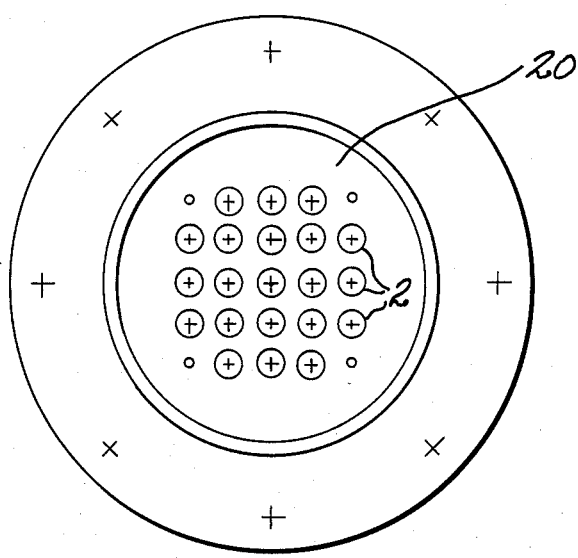
FIG. 2 is a cross-sectional view of the vertical tube heat exchanger of FIG. 1, taken along the lines and arrows 2—2 of FIG. 1.

To exemplify the interrelationships between the temperature difference and the flow rate necessary to the practice of the present invention, the heat exchanger apparatus shown in FIGS. 1 and 2 was constructed.

The column apparatus shown in FIGS. 1 and 2 was operated according to the parameters hereinafter described. Hot water to simulate a waste heat source was introduced at 1, FIG. 1, and conveyed into the interior of the vertical pipes 2 shown in FIG. 2. A fluid tight seal was provided at flange 3 to insure that the waste heat containing water passed only vertically downward through the tubes 2, shown in FIG. 2. A dilute solution, of typically LiBr and water from the absorber section of a solution heat pump, is introduced into the column 10 at 4 to contact only the outside of the tubes, shown in FIG. 1.

Figure 3:
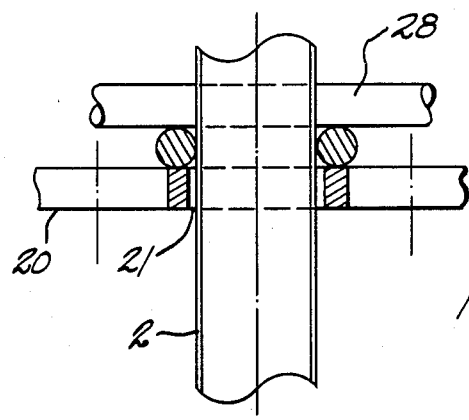
FIG. 3 is a partial broken cross-sectional view of one tube mounting embodiment of the present invention.

Baffle plates 20, FIG. 3, are provided at several locations along the lengths of the column 10 and constructed in a manner to provide an open annulus through which the dilute LiBr-water solution will flow by gravity downwardly onto the surface of the tubes 2. Centering device 28 is provided to maintain the relative position of tubes 2 and baffel plate 20. The dilute solution will evaporate water as it picks up waste heat from the water introduced at 1, into the interior of the tubes 2 through the tube walls. The water vapor produced can be removed from the column 10 at various locations, such as points 11 and 12. In the configuration shown in FIG. 1, a condenser is provided to condense the water vapor to liquid water.

The concentrated Li-Br-water solution reaching the bottom of the column 10 is removed at 15, normally to be recirculated to the absorber section of a solution heat pump apparatus as described hereinbefore. In the experimental set-up shown, the concentrated solution is removed at 15 and is introduced into a mixing tank 30 where it is diluted to the typical concentration of a dilute solution from the absorber section heat pump for reintroduction at 4 into the column 10. The operation of the described exemplary apparatus has produced the following criteria for obtaining the results of the present invention.

The main vertical section of the heat exchanger 10, outside of the tubes 2 is preferably maintained at a pressure of between 1 psia and 10 psia and more preferably between about 1 psia and 3 psia for best results.

Typically, the temperature of the waste heat containing water is between about 180° F. (82° C.) and about 250° F. (121° C.) and preferably between about 200° F. (93° C.) and about 220° F. (104° C.).

Preferably the temperature difference between the waste heat source and the binary working fluid should be in the range of from about 5° F. (2.8° C.) and about 25° F. (13.9° C.), more preferably between about 10° F. (5.6° C.) and about 20° F. (11.1° C.) and most preferably less than about 15° F. (8.3° C.).

To insure a uniform heat exchanging film of dilute binary solution on the exterior surfaces of the tubes 2 it is preferable to provide a sufficient flow rate of dilute solution such that under the conditions of heat exchange provided there is a uniform falling film of sufficient binary solution on the exterior surfaces of the tubes 2 and a temperature difference selected to provide for complete wetting of the tube surfaces and a minimum of sputtering or splattering of liquid from the tube surface. The wide range of applicability of the present invention, has been determined to be optimized by a flow rate of binary working fluid in the range of at least about 0.10 gallons per minute per inch of circumference preferably from about 0.10 to about 0.40 gallons per minute per inch of circumference of the vertical tube used in order to achieve the improved efficiency of heat transfer of the present invention.

Figure 4:
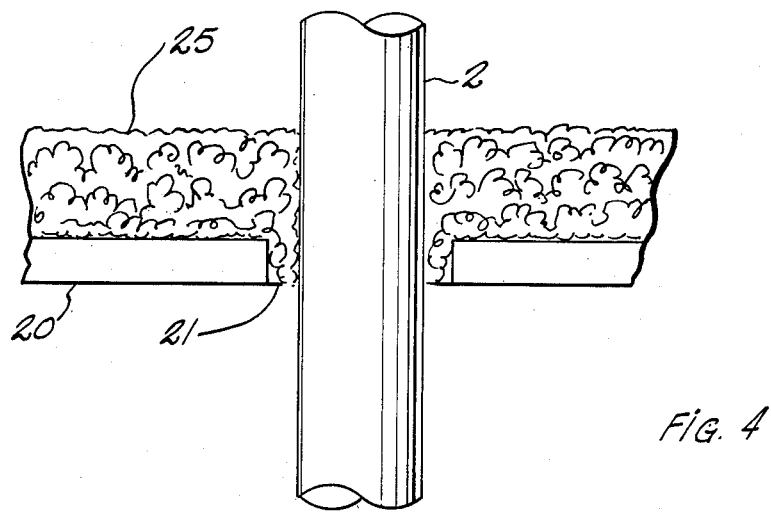
FIG. 4 is a partial broken cross-sectional view of another tube mounting embodiment of the present invention.
Figure 5:
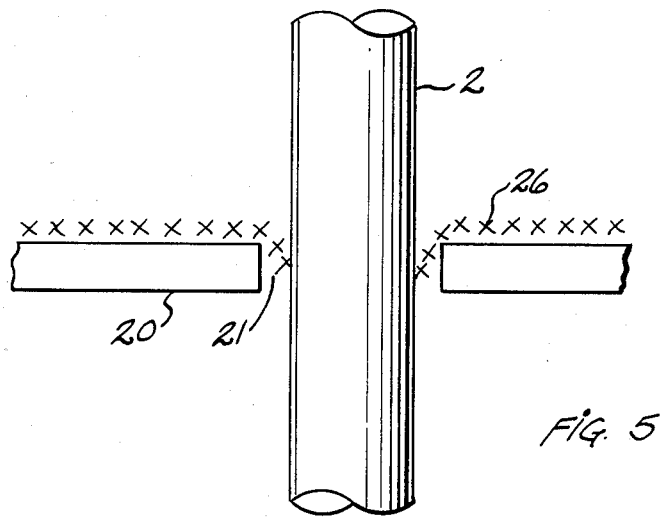
FIG. 5 is a partial broken cross-sectional view of still another tube mounting embodiment of the present invention.

As previously described, it is preferred to design the tube and baffle structure with the annular space 21 so as to distribute the binary working fluid as uniformly as possible onto the outer surface of the tubes within the flow rates previously described. Several designs will function in this regard including those shown in FIGS. 3, 4, and 5, where tubes 2 and distribution plates 20 are arranged with an annulus 21 and the plate 20 either provided with centering device 28, a porous pad 25 or a screen 26. Preferably, the centering device 25 will consist of rods of approximately the same dimension as the space between tubes 2 and installed in such a manner as to firmly hold tubes 2 in center of hole in distribution plate 20, thus forming a uniform annular space 21. Preferably, the pad 25 should be open enough in construction to permit sufficient free flow of the binary solution introduced above the distribution plate 20 through the pad 25 and the annulus 21 onto the tube 2 to achieve the identified flow rates. Most preferably, the pad 25 or screen 26 are forced into and partially through the annulus 21 to provide wicking and centering actions and better direct the fluid uniformly onto the outside surfaces of the tubes. An optimum design can be selected following the foregoing principles to achieve the functionality described without undue experimentation. In addition to the foregoing, additional design features can be utilized such as vertically splined tubes, and tubes with other special surface preparation including coatings and the like, if selected to minimize interference with the heat transfer from between the source of heat and the desired medium for receiving that heat and still promote uniform wetting of the exterior surface of the tube with binary working fluid. Any surface preparation or surface coatings should also be selected for their resistance to chemical attack by the binary fluid to minimize long-term maintenance problems in the design.

The experimental desorber shown in FIGS. 1 and 2, was designed as a vertical shell and tube heat exchanger. The outer shell was fabricated from 8-inch schedule 40 pipe (carbon steel) with a tube sheet/flange at top and bottom. The shell was also provided with several viewing ports for observation of the flow and wetting of the falling film of solution. Twenty-one copper alloy tubes (0.75 inch OD), were used in this design. The total heat transfer length was 7 feet 10 inches. Two baffle plates or flow distribution plates were used to direct the flow of the dilute solution onto the tubes. One plate, such as shown as plate 20 in FIG. 3, was located 4 inches below the top tube sheet; the second plate was located 27 inches above the bottom tube sheet. The lower baffle was included to redirect any solution that may have splattered into the shell back to the tubes. To quantify the amount of solution splattering, a 1-inch drip ring was welded to the inside of the shell, 4 inches from the bottom tube sheet.

The purpose of the desorber experiments was to measure the tube outside heat transfer coefficient ($h_o$) Btu/hr ft$^2$ °F. The experimental runs were carried out for the range of operating characteristics employed.

For each test run, the log mean temperature difference (LMTD) between the heating water and solution was calculated from measured temperatures according to:

$$LMTD = \frac{(T_{w,o} - T_{s,o}) - (T_{w,i} - T_{s,i})}{\ln \frac{(T_{w,o} - T_{s,o})}{(T_{w,i} - T_{s,i})}} \quad (1)$$

where the subscripts indicate:
w—water
s—solution
o—outlet
i—inlet

The total heat transfer rate ($\dot{Q}$) Btu/hour was calculated from the measured heating water flow rate and temperature difference according to:

$$\dot{Q} = \dot{m}_w \overline{C}_p (T_{w,i} - T_{w,o}) \quad (2)$$

where
$\dot{m}$ = mass flow rate (1 b/hr)
$\overline{cp}$ = specific heat (Btu/1 b° F.)

Using the design values, an overall heat transfer coefficient (U) Btu/ft$^2$ hr° F.), based on the tube outside heat transfer area (A), was then calculated using:

$$U = \frac{\dot{Q}}{(LMTD)(A)} \quad (3)$$

The tube outside heat transfer coefficient was calculated using the previously calculated value of U and the calculated value for the inside heat transfer coefficient ($h_i$) based on the Dittus-Boelter correlation for turbulent flow in tubes or pipes. The tube wall conduction term for copper was neglected since it has a minor resistance to heat flow to calculate $h_o$ from:

$$h_o = \frac{1}{\frac{1}{U} - \frac{1}{h_i}} \quad (4)$$

where:

$$h_i = 0.023 \frac{K}{D} (Re)^{0.8} Pr^{0.3} \quad (5)$$

D—Tube inner diameter
K—thermal conductivity for water
Re—Reynolds number based on D
Pr—Prandtl number for water The outside, inside, and overall heat transfer coefficients were calculated along with heat transfer rate, LMTD, and solution flow rate for each experimental run.

During the experiments, the binary solution was observed to exhibit blowing or sputtering off the tubes due to the high heat transfer rate at low flow rates and vacuum outside of the range previously described. When the vacuum is lower, more gas, such as nitrogen, is dissolved in solution, which tends to impede the desorption process. The effect of this is to reduce $\dot{Q}$ and LMTD, which seems to provide for adequate desorption to occur over the full tube length, which has the effect of raising $h_o$. Thus, the degree of vacuum affects $h_o$ only in an indirect way. The low vacuum slowed down the total heat transfer by acting as an additional resistance in desorption of the vapor. It is significant to note that the LMTD tests closely simulate the intended conditions for a desorber. Thus, the high $h_o$ tests are the ones of greatest design interest.

The vertical desorber described has a high heat transfer performance if operated under specific constraints identified. The tube outside heat transfer coefficient can be greater than 700 Btu/hr ft$^2$° F. provided the LMTD is limited to a maximum of 15° F. (i.e., the heat flux per tube is limited to 4,500 Btu/hr ft$^2$). Additionally, with the flow distribution plate design employed, the tubes were remarkably well-wetted under all circumstances from top to bottom under the conditions employed. Even when sputtering occurred, the tubes would tend favorably to rewet.

Other tests were conducted to establish the proper design and operating criteria for the generation and maintenance of a uniform film coverage of the LiBr-water binary solution on the surfaces of the heat exchanger tubes. As previously shown, the beneficial improved heat exchanging capability of the heat exchanger depends upon the maintenance of a uniform film of liquid covering the entire surface of each of the tubes containing the waste heat containing water.

The present invention is then directed to a heat exchanger where the flow rate into a vertical tube heat exchanger, as described, is between 0.10 to about 0.40 gallons per minute per inch of tube circumference at a pressure for a desorber of about 19.5 in. Hg (5.2 psia or 35.8 kPa) and a temperature difference of less than about 15° F.

The present invention has been described with respect to the presently known preferred embodiments thereof. It is contemplated, however, that the inventive concepts disclosed may be otherwise variously embodied and it is intended that the appended claims be construed to include alternative embodiments of the invention except insofar as limited by the prior art.

What is claimed is:

1. A vertical heat exchanger apparatus for exchanging heat comprising:
    vertical tube means for containing a heat source from which heat is to be extracted;
    container means surrounding said vertical tube means for containing fluid to be heated by said vertical tube means;
    means for introducing said fluid into said container means;
    means for exhausting said fluid from said container means;
    perforated baffle means contained horizontally in said container means and surrounding said vertical tube means for providing an open annulus between said baffle means and said vertical tube means to provide an opening through which said fluid must flow downward over the vertical tube means;
    fluid control means associated with said baffle means and said annulus and adapted to provide a substantially uniform falling film of said fluid on the surfaces of said vertical tube means, and
    said fluid control further including centering means comprising structural centering member means wherein the intersection defined by said structural member means receives, in contact relationship each vertical tube of said vertical tube means centrally of each opening in said perforated baffle means defining said open annulus.

2. The heat exchanger of claim 1 wherein each of the intersecting structural member means are approximately the size of the space between said vertical tube means.

* * * * *